Sept. 30, 1969   M. J. ALLEN   3,469,904
NIGHT VISION PERFORMANCE TESTER
Filed Sept. 16, 1966   3 Sheets-Sheet 1
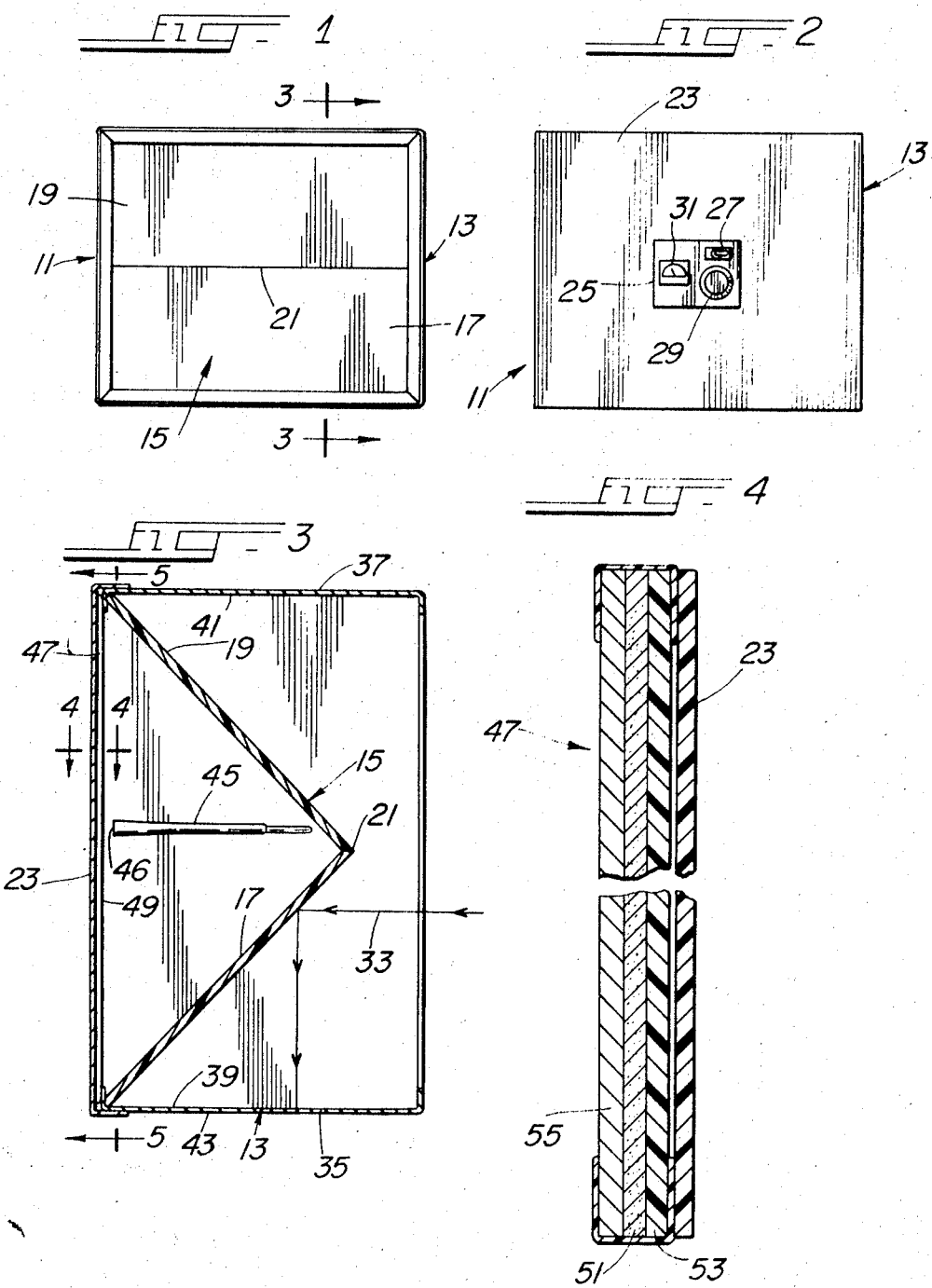
INVENTOR.
MERRILL J. ALLEN
BY Sept. 30, 1969  M. J. ALLEN  3,469,904
NIGHT VISION PERFORMANCE TESTER
Filed Sept. 16, 1966  3 Sheets-Sheet 2
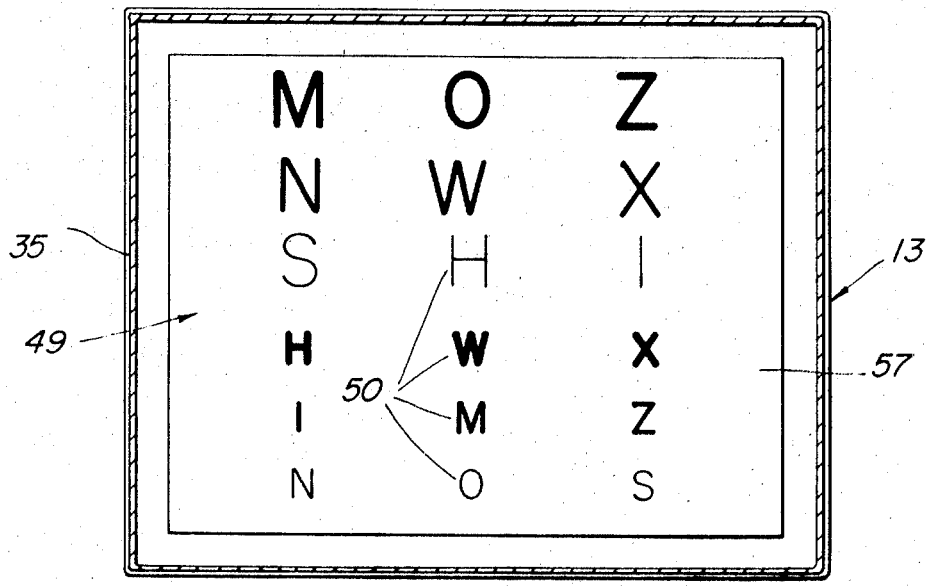
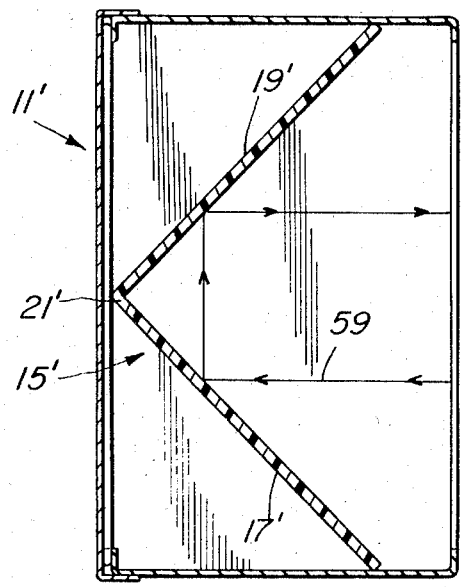
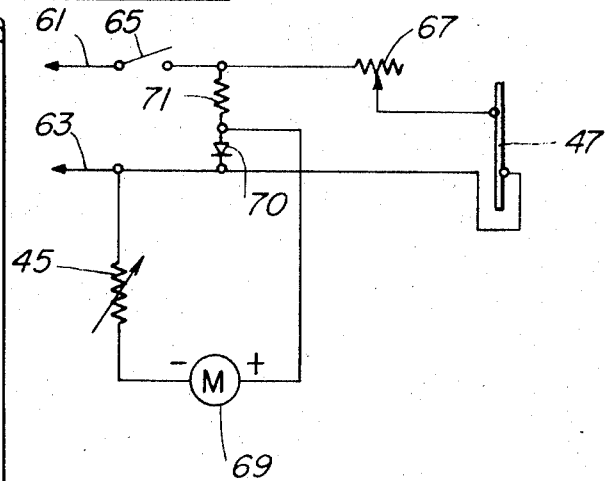
INVENTOR.
MERRILL J. ALLEN
BY

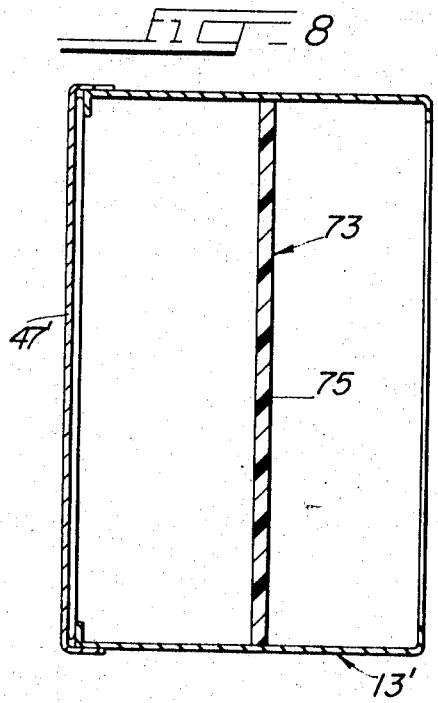
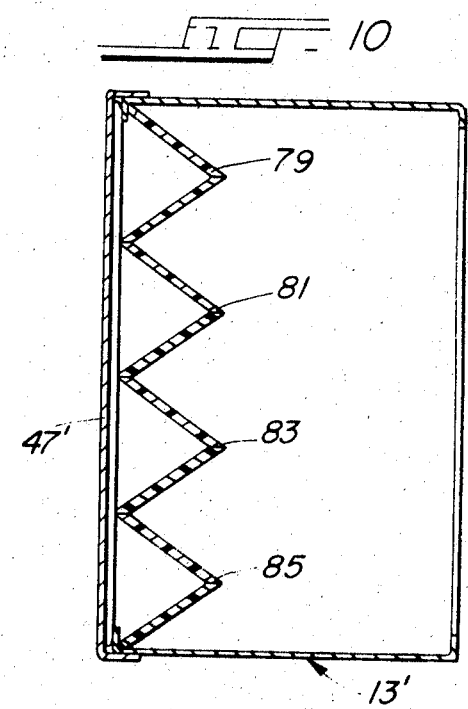
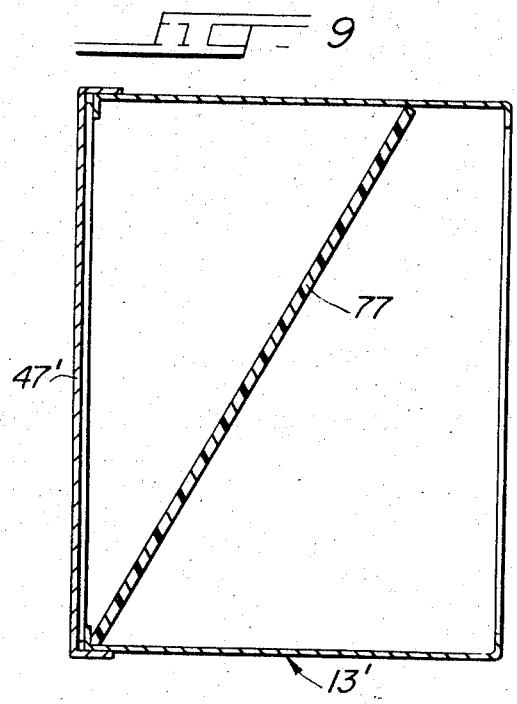

United States Patent Office 3,469,904
Patented Sept. 30, 1969

3,469,904
NIGHT VISION PERFORMANCE TESTER
Merrill J. Allen, Bloomington, Ind., assignor to Indiana University Foundation, Bloomington, Ind., a not for profit corporation of Indiana
Filed Sept. 16, 1966, Ser. No. 579,955
Int. Cl. A61b 3/02
U.S. Cl. 351—36
15 Claims

ABSTRACT OF THE DISCLOSURE

The mesopic visual acuity and ability to detect low contrast objects of a person is tested while the person is located in a normally lighted room. A filter is utilized to minimize the amount of ambient light appearing at a testing screen. The filter is formed by two planar filter parts jointed at an angle to form a V-shaped cross-section so as to eliminate or attenuate surface reflections. A reversible chart is utilized to provide more accurate testing.

This invention relates generally to a device for testing night vision performance, and more particularly this invention relates to a device for measuring the night vision performance of a person situated in a normally lighted room.

There are at least four primary factors that must be considered when testing a person's visual performance, namely: (1) the size of the test target; (2) the duration of time for which the target is displayed; (3) the contrast between the target and its background; and (4) the overall intensity of light at the target. This invention is primarily concerned with testing the effect on an individual's visual performance of variations in the latter two factors, which are closely interrelated.

It is well known that many people have difficulty seeing at night or at low illumination levels. This is particularly true of older people, since the transmission of the eye is progressively reduced with age. There are at least five major causes of visual difficulty when the contrast and illumination levels are decreased, two of which are directly related to aging. These five major causes of sub-par night vision performance are: (1) the presence of a small pupil that reduces illumination at the retina; (2) a reduced sensitivity of the retina as a result of nutritional deficiencies or pathological involvements of the eyes and central nervous system; (3) an uncorrected refractive error; (4) an increased absorption of light in the lens of the eye with increasing age which reduces the light intensity at the retina; and (5) an increased scattering of light with increasing age which precedes development of cataracts which causes a reduction in contrast and intensity at the retina. Also, these factors are cumulative, so that the presence of one of these factors to a degree insufficient to greatly hamper night vision performance, when added to other factors that are present may produce poor night vision performance. Thus, the results of aging may be more pronounced in some individuals than in others. Whatever the cause (or causes), there are a substantial number of people who have difficulty in performing adequately in low contrast or low light level conditions.

One area in which reduced visual performance at night is especially important is that of automobile driving. While many people are aware of their night vision deficiencies and take additional care in their driving or refuse to drive altogether, there are still a significant number of accidents resulting from the inability of a driver to see sufficiently well in the nighttime. Thus, it would be desirable to be able to pinpoint particular people who have a night vision problem and to be able to ascertain the extent of their problem with respect to the light available for night driving.

In the past, visual tests of night driving ability usually have been conducted in a nearly complete absence of light, so that the subject's "scotopic" or "rod" vision was measured (as opposed to testing in normal daylight, wherein the subject's "photopic" or "cone" vision is measured). However, night driving is conducted with "mesopic" vision (i.e., intermediate between "scotopic" and "photopic" vision). A person's visual acuity is best at high levels of illumination, and most visual acuity tests are run at these high levels of illumination. As illumination is reduced toward "mesopic" levels, acuity falls regularly and predictably in a given person. However, acuity falls more rapidly in some people than in others and this deterioration of vision cannot be predicted from a test at a high illumination level. The deterioration of visual acuity may be predicted with fair accuracy by running a dark adaptation test, which is difficult and time consuming (requiring twenty to thirty minutes in a totally dark room following a three to five minute pre-adaptation period). Therefore, a need exists for a quick and simple test that will predict visual performance at "mesopic" levels.

The night driving task involves not only acuity, but also the ability to detect low contrast objects that might be a hazard and the ability to resist the glare of headlights and street lights normally encountered while driving. A complete test of night driving vision performance should thus include a test of the ability to differentiate low contrast objects and a test of the subject's glare resistance.

Besides the night driving problem, there are many other areas in which it would be desirable to be able to ascertain the amount of light that a particular person needs to perform a specific visual task. For ease of reference the term "night vision" has been used throughout, but it should be realized that this term is intended to encompass all visual observances of images having a low contrast relationship to an associated background. Since individual differences from person to person preclude the use of full light tests to predict visual ability at lower levels of contrast and illumination, it is necessary to have some method for easily and accurately measuring the night vision performance of each individual. A test that indicates the amount of light needed by a person for a specific visual task would be helpful to lighting engineers, legislators, automobile licensing agencies, insurance agencies, ophthalmic practitioners, and others.

Prior art devices for making such tests have the disadvantage of having to be conducted in a darkened room (dark adaptation tests). This presents the difficulties of obtaining a suitably light-free area and of forcing the administrator of the test to work in the dark. This latter difficulty, of course, makes the test difficult to administer and increases the probability of incurring an error in determining the results. Also, these difficulties of the prior art devices make the test quite time consuming, which is a highly undesirable feature in locations requiring the administration of a large number of tests, such as the testing of applicants for driver's licenses. A further disadvantage of the dark adaptation test is the psychological factor of a subject's apprehension in a totally darkened room.

Another disadvantage of the prior art is that the administration of visual tests involved a fixed chart, which is soon memorized by the subject, or elaborate and costly equipment to provide a variety of visual testing characters. These deficiencies of the prior art might hamper the fair and accurate administration of visual tests.

These disadvantages of the prior art are overcome by the present invention of a device for measuring night vision performance while the person being tested is located in an ordinarily lighted room. Briefly, in the preferred embodiment described herein, the invention provides an indicia-bearing transparent chart. The indicia are opaque or partially opaque and may be of a uniform size and opacity or of differing sizes and opacities, but in any case a preferred embodiment utilizes symmetrical and reversible letters so that the chart may be rotated 180° and still present letters to the viewer, although in a different sequence and with different letters, such as M instead of W. While the indicia-bearing chart is described in the context of measuring night vision performance, it should be realized that the chart has an independent uniqueness that gives it utility in environments other than that disclosed herein.

The chart is uniformly illuminated by an appropriate light source. While any type of light source that can be made to provide a uniform illumination is suitable, a panelescent light source has been found to be especially appropriate in the embodiments of this invention. As is well known to one skilled in the art, a panelescent light source comprises a layer of phosphorescent material sandwiched between conducting electrodes, so that a uniform illumination is obtained over the area of the panelescent source with an intensity proportional to the magnitude of the electrical signal applied between the electrodes. By an appropriate control means, the electrical signal applied to the panelescent light source may be regulated to give a range of light intensities and hence continuously vary the illumination of the chart. To measure the intensity of the illumination at the chart, a photosensitive device may be placed in series with an appropriate measuring device, such as a conventional current meter (ammeter or milliammeter). The meter should be properly calibrated to indicate the light intensity at the chart as a function of the current through the meter, which will depend upon the impedance of the photoresponsive device which varies in response to light amplitude changes of the panelescent light source.

To adapt this structure for use in a lighted environment, it is necessary to eliminate, or at least greatly reduce, the effect of the ambient light on the illumination intensity at the chart. One way to do this would be to place a filter in front of the chart, between the chart and the person being tested. Another method, the one disclosed in the preferred embodiment and described herein, is to place a transparent filter light control structure having a V-shaped cross-section in front of the chart, between the chart and the person being tested. The apex of the V-shaped cross-section can either face toward the person being tested or away from the person being tested. When the apex of the V-shaped cross-section faces the person being tested, ambient light impinging upon the device is reflected in such a manner that it is directed away from the eye of the person. If light absorbing material is placed about the transparent structure, the reflected incident light is effectively trapped. When the apex of the V-shaped cross-section is face away from the person being tested, an autocollimator effect is achieved. To decrease the effect of ambient light in this embodiment, a conventional anti-reflection coating may be placed upon both reflecting surfaces of the V-shaped cross-section, so that after being reflected from each of these surfaces the intensity of the light is greatly reduced. Therefore, in either of these embodiments, the intensity of the incident ambient light has essentially no effect upon the intensity of the light at the chart, and hence an accurate measurement of the person's night vision performance is quickly and easily obtained.

There are three significant arrangements of the present inveniton, each of which has particular advantages and which may be compared to a prior art arrangement developed by the present applicant, in which an incandescent light source was coupled with an opal plastic sheet to provide a uniform intensity light, and a grey filter was used to reduce the effect of ambient light. The three significant arrangements of the present invention may be decribed as: (1) a light control structure having a V-shaped cross-section and a panelescent light source; (2) a light control structure having a V-shaped cross-section and an incandescent light source; and (3) a low transmission planar filter and a panelescent light source.

The first specific arrangement (i.e., utilization of a panelescent light with a light control structure having a V-shaped cross-section) has the advantages of: (1) less heat than an incandescent light source; (2) some size advantage over a device using an incandescent light source with a V-shaped light control structure; (3) less weight than a device using an incandescent light source with a light control structure having a V-shaped cross-section; (4) constant color light produced by the panelescent source as compared to color temperature gradations over an incandescent bulb; (5) minimization of incident ambient light effect as compared to use of planar filter light control; (6) minimization of the filter needed because of the shading effect of the housing of the device; and (7) better aging characteristics of the panalescent light source as compared to the aging characteristics of an incandescent light bulb. The second arrangement (i.e., utilization of a light control structure having a V-shaped cross-section, in conjunction with an incandescent light source) has the advantages of reducing the ambient light effect (because of the light control structure having a V-shaped cross-section) and yet having maximum light intensity (because of the incandescent light source). The third arrangement (i.e., utilization of a planar filter light control structure with a panelescent light source) provides minimum bulkiness, but control of the ambient light effect is not as effective. Therefore, the particular arrangement to be utilized will depend upon the requirements of the particular use and ambient conditions.

While these specific arrangements are discussed in detail it should be realized that this inveniton is not limited to these embodiments but may also include variations such as: (a) a single planar light control structure that is angled with respect to the person being tested; and (b) a multiplicity of V-shaped structures set side-by-side between the chart and the person being tested. These additional embodiments do not exhaust the possibilities of this invention, which includes all of the embodiments discussed and all other embodiments or variations that may be constructed by an individual skilled in the art.

Accordingly, a primary object of the present invention is to provide a device for rapidly and accurately measuring the amount of light that a particular person needs to perform a specific visual task.

Another object of this invention is to quickly and accurately ascertain a person's "mesopic" vision performance abilities.

A further object of this invention is to provide a device for measuring a person's night vision performance when the person is located in a normally lighted room.

Yet a further object of this invention is to greatly reduce the effect of ambient light on an illuminated display without obscuring vision of the display.

Still a further object of this invention is to provide an indicia-bearing test chart that may be easily adjusted to provide a different sequence of indicia during the administration of a test.

These and other objects, advantages, and features of the subject invention will hereinafter appear, and, for purposes of illustration, but not of limitation, exemplary embodiments of the subject invention are shown in the appended drawings in which:

FIGURE 1 is a front view of one embodiment of the device of this invention;

FIGURE 2 is a back view of the embodiment of FIGURE 1;

FIGURE 3 is an enlarged sectional view taken along line 3—3 of FIGURE 1;

FIGURE 4 is an enlarged sectional view taken along line 4—4 of FIGURE 3;

FIGURE 5 is an enlarged sectional view taken along line 5—5 of FIGURE 3 illustrating a chart that may be used in a device constructed according to the present invention;

FIGURE 6 is a side sectional view, corresponding to FIGURE 3, of another embodiment of a device constructed in accord with the teachings of the present invention;

FIGURE 7 is a schematic circuit diagram of a control and measuring circuit utilized in a device constructed according to the present invention;

FIGURE 8 is a side sectional view, corresponding to FIGURE 3, of another embodiment of a device constructed in accord with the teachings of the present invention;

FIGURE 9 is a side sectional view, corresponding to FIGURE 3, of yet another embodiment of a device constructed in accord with the teachings of the present invention; and FIGURE 10 is a side sectional view, corresponding to FIGURE 3, of still another embodiment of a device constructed in accord with the teachings of the present invention.

A night vision performance testing device 11 is illustrated in the front view of FIGURE 1. The testing device 11 comprises a housing 13 in which a light control or light screening structure 15 may be seen in the FIGURE 1 view. Housing 13 is a metallic box having a rectangular cross-section with one of the two largest sides of the box removed, resulting in the formation of an open rectangular box. Light control structure 15 has a part 17 and a part 19 which meet at an intersection line 21.

In FIGURE 2 the back portion 23 of housing 13 of device 11 is illustrated. A box 25 is fastened to the back portion 23 of housing 13 and provides a mounting structure for accessible elements of a control circuit utilized in the subject invention. Box 25 need not be fastened to housing 13, but may be separated therefrom to provide a remote control and meter read-out by proper arrangement of the electrical connections. A toggle switch handle 27 controls the application of power to a light source (not shown in this drawing) for the testing device 11. A rotatable dial 29 regulates the amount of electrical energy supplied to the light source, and an indication of the intensity of the illumination supplied by the light source is visible through window 31. The significance of these elements will become apparent from the subsequent discussion of the subject invention.

From the enlarged sectional view of FIGURE 3, the form of light control structure 15 and other features of the subject invention become apparent. It may be seen that parts 17 and 19 of light control structure 15 form a structure having a V-shaped cross-section, with the apex of the V-shaped cross-section falling on intersection line 21. In this particular embodiment, the apex of the V-shaped cross-section faces toward the person who is being tested. A number of different angles between parts 17 and 19 may be used, but positioning parts 17 and 19 at right angles offers a number of mechanical advantages. With such a positioning, parts 17 and 19 will be at an angle of 45° to a horizontal ray of light schematically illustrated by line 33.

Parts 17 and 19 of the light control structure 15 may be formed of any transparent neutral colored filter material such as glass or a clear plastic (e.g., transparent methyl methacrylite). While a light control structure having a V-shaped cross-section has been described, it should be realized that parts 17 and 19 may be replaced by a single planar filter (e.g., a 10% transmission grey filter). The planar filter would have a low transmission factor to reduce the addition of ambient illumination to the output of the built-in light source.

With the structure shown in FIGURE 3, light rays impinging upon light control structure 15 will be reflected away from the eyes of the person being tested. Taking the horizontal ray 33 as an example, the ray will be reflected from part 17 and directed against side 35 of housing 13. Similarly, a horizontal ray impinging upon part 19 would be reflected against wall 37 of housing 13. The inner surfaces 39 and 41 of walls 35 and 37, respectively, may be provided with a light absorbent material (e.g., black felt) to trap the light directed thereagainst and prevent its further reflection.

If the light ray 33 were to be rotated in a counterclockwise direction in the FIGURE 3 orientation, the ray would continue to be directed from part 17 against surface 39 of wall 35 until the light ray no longer impinged upon part 17. On the other hand, if ray 33 were rotated in a clockwise direction in the FIGURE 3 orientation, the light ray striking adjacent to intersection line 21 on part 17 would be reflected beyond the end of wall 35. However, this result would occur only for a small solid angle of light rays clustered near a ray perpendicular to part 17, due to the extension of wall 35. Since this light would still be reflected away from the eyes of the person being tested, no undesirable effects would result. When ray 33 has been rotated 45° in a clockwise direction, it would be reflected so as to miss wall 35 if it strikes part 17 anywhere between intersection line 21 and a point along a line extending from intersection line 21 to wall 35 along part 17. This is so because the outer surface 43 of wall 35 would intercept any light directed toward the other portion of part 17. A ray rotated more than 45° from the position shown in FIGURE 3 would be reflected to a point closer to the eyes of the person being tested the closer it approached a rotation of 90° in a clockwise direction from the orientation of ray 33 as shown in FIGURE 3. However, wall 35 would intercept and prevent all but a very small number of these rays from striking on part 17. By extending wall 35 even farther, all of these rays could be eliminated. If desired, to further minimize the effects of the ambient light, parts 17 and 19 could be coated with a conventional anti-reflection coating (e.g., magnesium fluoride for glass filters), but this would not normally be necessary.

A light responsive device 45 is located behind light control structure 15. Light responsive device 45 includes a light sensitive area 46 which has an electrical resistance that varies with the intensity of the light that falls upon it. Light responsive device 45 is electrically connected (the physical connection is not shown in the drawings) in a measuring circuit so that the variations in the electrical resistance of area 46 give a measurable indication of the intensity of the light falling upon the light sensitive area 46 of device 45.

Light is produced by a light source 47 located adjacent back wall 23 of frame 13. An indicia-bearing chart 49 is located between light source 47 and light control structure 15. The light responsive device 45 is so positioned that its light sensitive area 46 detects the level of illumination at chart 49, which is primarily determined by the intensity of the light source 47.

While light source 47 may be any conventional type of light producing arrangement, e.g., an incandescent light bulb placed behind an opal plastic sheet to diffuse the light and produce a uniform intensity, the preferred means of producing light with this invention is a panelescent light source of the type illustrated in FIGURE 4. This light source may be any conventional type of panelescent source, such as the General Electric electroluminescent lamp. Panelescent light source 47 comprises a layer of crystalline phosphors 51 sandwiched between a metallic electrode 53 and a translucent electrode 55. An alternating electrical signal is applied between electrodes 53 and 55. The crystalline phosphors in layer 51 absorb the electrical energy and convert it into a uniform intensity light, with the production of only a minimal amount of heat.

Thus, a uniform intensity light is produced for illumination of chart 49.

Chart 49 is shown in detail in the enlarged view of FIGURE 5. From this view it may be seen that chart 49 comprises a sheet of transparent material 57 with opaque or partially opaque indicia (e.g., a plurality of letters 50) formed thereon. Transparent sheet 57 may be of any suitable material, such as a clear plastic. Of coarse, it should be realized that the indicia could be formed directly on a panelescent light source or on the filter, if a planar filter is used. The indicia formed on sheet 57 may be of any desired size, shape, or contrast and may have any appropriate spacing, limited only by the requirements of a given test. The particular indicia utilized in this embodiment, though, are all symmetrical and reversible letters, i.e., a rototion of chart 49 by 180° would provilde a chart of alphabetic letters, but the letters would have a different sequence than that shown in the FIGURE 5 orientation. This particular feature permits rotation of the chart to forestall memorization of the letter sequence, whether deliberate or unconscious. Additional features that could be utilized in connection with the letters are illustrated in FIGURE 5, such as different sizes and different opacities of the letters in order to provide different contrasts. The differences in size and opacity, of course, permit testing of the person's vision under different conditions. Again it should be emphasized that the chart shown in FIGURE 5 is merely illustrative of one of the various arrangements of indicia that may be utilized and is not meant to constitute a prescribed arrangement for any particular application.

A separate embodiment of the testing device is illustrated in FIGURE 6. In this embodiment parts 17' and 19' of a light control structure 15' are placed so that intersection line 21', upon which the apex of the V-shaped cross-section of struction 15' falls, is positioned away from the person being tested. With this structure an autocollimating result is achieved. This result may be described in connection with a horizontal ray schematically illustrated by line 59. Ray 59 enters device 11' and strikes against part 17', which reflects the ray against part 19', which in turn reflects ray 59 back out of device 11'. After the double reflection the departing ray 59 would have an intensity only about 0.25% of its original intensity. To eliminate undesired effects produced by very high amounts of incident ambient light, parts 17' and 19' could be coated with a conventional anti-reflection coating (e.g., magnesium fluoride on glass filters). The light source and chart arrangement for the embodiment of FIGURE 6 is the same as that for the FIGURE 3 embodiment, except that light responsive device 45 would be displaced from the central position in which it is shown in the FIGURE 3 embodiment.

In FIGURES 8–10 three other embodiments of the subject invention are disclosed. To simplify the description of these embodiments, elements similar to elements of the FIGURE 3 embodiment have been indicated by primed corresponding numbers.

The embodiment of FIGURE 8 reveals a panelescent light source 47' utilized in conjunction with a planar filter 73. Planar filter 73 may be any type of light reducing medium, such as a 10% transmission grey filter. While this embodiment does not possess the additional ambient light reducing benefits of the V-shaped cross-section structure, it does have the advantages of being relatively light and compact. Also, to reduce the effect of ambient light on the test surface 75 of filter 73 could be coated with an anti-reflection coating (e.g., magnesium fluoride for a glass filter).

In FIGURE 9 a planar transmission filter 77 has been placed obliquely to the line of sight of the test subject. In essence, this light control structure is equivalent to one-half the FIGURE 3 or FIGURE 6 light control structures. The angle at which the filter 77 is placed to the test subject's line of sight may be varied, and the filter 77 may be angled in the other direction from light source 47', i.e., from the top of source 47' in the FIGURE 9 orientation. As in the case of the FIGURE 3 and 6 embodiments, the panelescent light source 47' may be replaced by a conventional incandescent light source. This embodiment couples the ease of manufacturing a planar filter structure with some of the ambient light effect reducing characteristics of the V-shaped cross-section light control structure.

FIGURE 10 illustrates yet another light control structure. In this arrangement a plurality of elements having a V-shaped cross section 79, 81, 83, and 85 are placed in a side-by-side series at right angles to the line of sight of the person being tested and located between the light source and the person being tested. Each of the elements 79, 81, 83, 85 is a replica of the V-shaped cross-section light control structure 15 of FIGURE 3. Of course, the arrangement of elements 79, 81, 83, 85 could also be as a series of elements similar to light control structure 15' in the FIGURE 6 embodiment. While a series of four elements has been shown, this is purely an exemplary figure and as many light control elements as desired may be placed in series.

FIGURE 7 schematically illustrates a light source energization and light intensity measurement circuit that can be utilized with any of the FIGURES 3, 6, 8–10 embodiments. In this circuit, AC power is supplied to lines 61 and 63. A switch 65 controls the application of power to the panelescent light 47. Switch 65 can be actuated by toggle switch handle 27 located on back portion 23 of housing 13 of device 11 (or remote therefrom, as indicated above). The amount of electrical power applied to panelescent source 47 is controlled by a rheostat 67. The setting of rheostat 67 is achieved through a rotatable dial 29, which also can be located on back portion 23 of housing 13 of device 11 (or remote therefrom).

Measurement of the light intensity in the vicinity of chart 49 is achieved by utilizing a photoresponsive device 45 as hereinbefore described. In FIGURE 7, photoresponsive device 45 is illustrated as a variable resistor, since this is the function that it serves in the circuit. Photoresponsive device 45 is connected in series with a conventional current meter (such as an ammeter or milliammeter) 69, and the series combination is connected across voltage regulating Zener diode 70, which is connected in series with voltage dropping resistor 71 across lines 61 and 63. The light intensity at chart 49 will determine the resistance of the photoresponsive device 45, and hence the current flowing through meter 69. Therefore, the light intensity may be determined by the indication on meter 69, as seen through window 31 on back portion 23 of housing 13 (or at a remote location if box 25 is remotely located).

In operation, the person whose night vision performance is to be tested is positioned a predetermined distance from the front of device 11. Switch 65 will then be closed to energize panelescent light source 47. Rheostat 67 will then be adjusted until the person being tested is able to discern the desired indicia on chart 49. At this time the light intensity on chart 49 may be determined from meter 69, so that the light needed by the person to perform this specific visual task is accurately determined.

It should be understood that the embodiments described are merely exemplary of the preferred practices of the present invention and that various changes, modifications, and variations may be made in the details of construction, arrangements, and operations of the elements disclosed herein, without departing from the spirit and scope of the present invention, as defined in the appended claims.

What is claimed is:

1. A device for testing the night vision performance of a person located in a normally lighted room at a distance from and looking into the device comprising:
   an indicia-bearing chart;

light means adapted to uniformly illuminate said chart;

a pair of planar filter parts forming a transparent filter light control structure having a V-shaped cross-section located between said chart and the person being tested and arranged to minimize surface reflection of impinging ambient illumination toward the eyes of the person and to minimize penetration of the ambient light to the vicinity of said indicia-bearing chart; and measuring means for indicating the level of illumination of said chart;

whereby the level of illumination necessary for the person being tested to perform a standard visual task may be ascertained independently of ambient illumination.

2. A device as claimed in claim 1 and further comprising means for selectively controlling the illumination of said chart by said light means.

3. A device as claimed in claim 1 wherein said light control structure having a V-shaped cross-section is positioned with the apex of the V facing toward the person to be tested.

4. A device as claimed in claim 1 wherein said light control structure having a V-shaped cross-section is positioned with the apex of the V facing away from the person to be tested.

5. A device as claimed in claim 1 wherein said light means comprises a panelescent light source.

6. A device as claimed in claim 1 and further comprising means for positioning light absorbing material about said light control structure to trap illumination that is reflected by said transparent V-shaped cross-section away from the eyes of the person being tested.

7. A device as claimed in claim 1 wherein said measuring means comprises a photoresponsive electrical measuring device.

8. A device as claimed in claim 1 wherein said indica-bearing chart is provided with letters of the alphabet formed so that they may be rotated 180° and still represent a letter of the alphabet, thereby providing an arrangement in which the sequence of letters on the chart may be changed merely by rotating the chart 180°.

9. A device as claimed in claim 1 and further comprising a box having a rectangular cross-section with one side removed to form an open rectangular box wherein:

said indicia-bearing chart is located in said open rectangular box adjacent a second side positioned opposite said one side;

said light means comprising a panelescent light source located between said chart and said second side;

regulating means are mounted on said second side for selectively controlling the amount of illumination produced by said panelescent light source;

said measuring means comprises a photoresponsive electrical measuring device mounted on said second side; and said light control structure having a V-shaped cross-section extends from said indicia-bearing chart to said one side.

10. A device as claimed in claim 1 wherein the surface of said transparent filter light control structure toward the person being tested is coated with an anti-reflection coating.

11. A device as claimed in claim 1 wherein said indicia-bearing chart comprises:

a reversible transparent member; and opaque indicia formed on said transparent member so as to be visible from either side of said member, said indicia being symmetrical and reversible, whereby rotation of said transparent member by 180° about a vertical axis to reverse the sides of said transparent member will provide a different sequence of recognizable indicia than that originally presented.

12. A chart as claimed in claim 11 wherein said transparent member comprises a sheet of clear plastic.

13. A chart as claimed in claim 11 wherein said opaque indicia are symmetrical reversible letters of the alphabet.

14. A device as claimed in claim 1 wherein said planar filter parts are located at an angle of 90° with respect to each other.

15. A device for testing the night vision performance of a person located in a normally lighted room at a distance from and looking into the device comprising:

an indicia-bearing chart;

light means adapted to uniformly illuminate said chart;

a transparent filter light control structure comprising a plurality of light control elements, each of which has a pair of planar filter parts positioned to form a member having a V-shaped cross-section, placed adjacent one another in abutting relationship to form a series of said light control elements extending transversely to a line of sight from the person being tested to said indicia-bearing chart, said series of elements located between said chart and the person being tested and arranged to minimize surface reflection of impinging ambient illumination toward the eyes of the person and to minimize penetration of the ambient light to the vicinity of said indicia-bearing chart; and measuring means for indicating the level of illumination at said chart;

whereby the level of illumination necessary for the person being tested to perform a standard visual task may be ascertained independently of ambient illumination.

References Cited

UNITED STATES PATENTS

| | | | |
|---|---|---|---|
| 1,564,495 | 12/1925 | Sheard | 351—37 |
| 1,823,707 | 9/1931 | St. Clair | 350—276 X |
| 2,234,240 | 3/1941 | Frohring et al. | 351—36 |
| 2,947,232 | 8/1960 | Armentrout et al. | |
| 2,958,762 | 11/1960 | Cheney. | |
| 3,001,015 | 9/1961 | Weiss. | |
| 3,214,596 | 10/1965 | Schwerdt et al. | |
| 3,355,237 | 11/1967 | Simpson | 351—37 |

DAVID SCHONBERG, Primary Examiner

P. A. SACHER, Assistant Examiner

U.S. Cl. X.R.

351—1, 32, 37